C. P. BENEDICT.
APPLE CORING DEVICE.
APPLICATION FILED SEPT. 5, 1916.
1,206,403.
Patented Nov. 28, 1916.
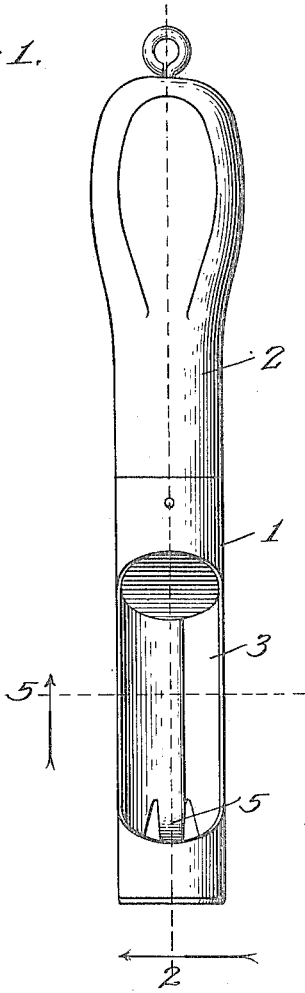
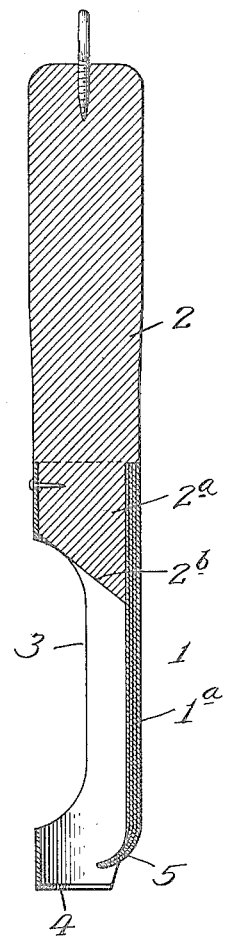
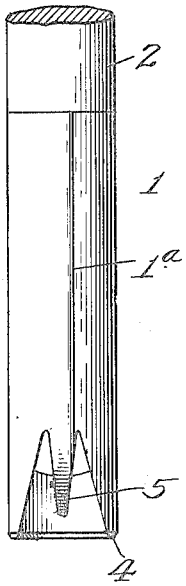
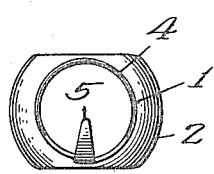
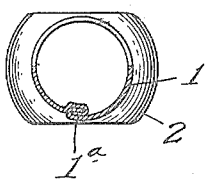
Witnesses:
Inventor:
Charles P. Benedict,
By Dyrenforth, Lee, Chritton and Wiles
Attys.

UNITED STATES PATENT OFFICE.

CHARLES P. BENEDICT, OF MONTCLAIR, NEW JERSEY, ASSIGNOR TO THE BOYE NEEDLE COMPANY, OF CHICAGO, ILLINOIS, A CORPORATION OF ILLINOIS.

APPLE-CORING DEVICE.

1,206,403. Specification of Letters Patent. Patented Nov. 28, 1916.

Application filed September 5, 1916. Serial No. 118,455.

*To all whom it may concern:*

Be it known that I, CHARLES P. BENEDICT, a citizen of the United States, residing at Montclair, in the county of Essex and State of New Jersey, have invented a new and useful Improvement in Apple-Coring Devices, of which the following is a specification.

This invention relates particularly to an apple-coring device; and the primary object is to provide a simple and cheap device which will enable an apple to be cored with great facility, leaving, if desired, a cup in the apple for containing sugar, desirable in the baking operation.

The invention is illustrated in its preferred embodiment in the accompanying drawing, in which—

Figure 1 represents a plan view of the device; Fig. 2, a longitudinal sectional view taken as indicated at line 2 of Fig. 1; Fig. 3, a broken rear side view of the device; Fig. 4, a view of the operative end of the device; and Fig. 5, a sectional view taken as indicated at line 5 of Fig. 1.

The device comprises a tubular member 1 having a sharpened lower extremity, and a handle 2.

The tubular member 1 has its front wall cut away from a point near its upper end to a point near its lower end, as indicated at 3. The lower end of the member 1 is beveled or sharpened, as indicated at 4. The lower portion of the member 1 is also provided with a forwardly-turned hook or point 5, which projects into the tube. The member 5 may be formed by cutting away portions of the tube at the lower end thereof in the form of a W, leaving a triangular or pointed member, which is curved inwardly, as indicated in Fig. 2.

The handle 2, in the form illustrated, may be composed of wood, having a shank $2^a$ inserted in the upper end of the tube 1. The lower end of the shank $2^a$ is beveled, as indicated at $2^b$.

The manner of using the device is to insert the operative end so that it will encircle the core, preferably not passing the implement entirely through the apple, then turn the implement so that the tongue 5 will cut the lower portion of the core, after which the implement may be withdrawn, the core being withdrawn with it. As the implement is used successively, the core within the implement is forced upwardly by the next core, and forced outwardly by the beveled surface $2^b$. If desired, the implement may be passed wholly through the apple, but the core will be withdrawn in the operation of withdrawing the implement.

In the illustration given, the tubular member 1 is formed of sheet metal rolled into tubular form and provided with a seam $1^a$. The tongue 5 is formed at the lower end of the seam $1^a$, so that the tongue is thus strengthened, or made of more than one ply of metal.

The foregoing detailed description has been given for clearness of understanding only, and no unnecessary limitation should be understood therefrom, but the appended claims should be construed as broadly as permissible in view of the prior art.

What I regard as new and desire to secure by Letters Patent is—

1. A coring-device comprising a tubular member having one wall cut away and having an inwardly-projecting tongue at the lower end.

2. A coring-device comprising a tubular member having its front wall cut away and having its rear wall provided near the lower end of the tubular member with an inwardly-curved tongue, and a handle.

3. A coring-device comprising a tubular member having a sharpened lower end edge and having a portion of its front wall cut away, the lower portion of the rear wall of said tubular member being provided with an in-curved tongue, and a handle from which said tubular member depends.

4. A coring-device comprising a sheet-metal tubular member having a vertical seam, the metal being cut away at points flanking the lower end of said seam and the seam-portion curved inwardly, a portion of the front wall of said tubular member being also cut away, and a handle carrying said tubular member.

5. A coring-device comprising a metal tubular member having a portion of its front wall cut away and having a sharpened lower end edge, the lower end-portion of said tubular member having metal cut away to form a tongue, said tongue being curved inwardly.

CHARLES P. BENEDICT.